United States Patent
Descatoire et al.

(10) Patent No.: US 10,328,765 B2
(45) Date of Patent: Jun. 25, 2019

(54) AIR DISTRIBUTION DEVICE FOR TURRET

(71) Applicant: NEXTER SYSTEMS, Roanne (FR)

(72) Inventors: Xavier Descatoire, Versailles (FR); Aymeric Peloux, Boulogne Billancourt (FR)

(73) Assignee: NEXTER SYSTEMS, Roanne (FR)

( * ) Notice: Subject to any disclaimer, the term of this patent is extended or adjusted under 35 U.S.C. 154(b) by 0 days.

(21) Appl. No.: 15/464,669

(22) Filed: Mar. 21, 2017

(65) Prior Publication Data

US 2017/0267054 A1 Sep. 21, 2017

(30) Foreign Application Priority Data

Mar. 21, 2016 (FR) ...................................... 16 00471

(51) Int. Cl.
| | |
|---|---|
| *A62C 27/00* | (2006.01) |
| *B60H 1/00* | (2006.01) |
| *F41H 5/20* | (2006.01) |
| *F41H 7/03* | (2006.01) |

(52) U.S. Cl.
CPC ..... *B60H 1/00028* (2013.01); *B60H 1/00414* (2013.01); *B60H 1/00564* (2013.01); *F41H 5/20* (2013.01); *F41H 7/03* (2013.01)

(58) Field of Classification Search
CPC ................................. B60H 1/00; A62C 27/00
USPC ....................... 454/73, 74, 76, 136
See application file for complete search history.

(56) References Cited

U.S. PATENT DOCUMENTS

| | | | | |
|---|---|---|---|---|
| 1,779,160 A | * | 10/1930 | Diehl | B64D 13/04 244/208 |
| 2,330,322 A | * | 9/1943 | Williams, Jr. | B64D 15/02 237/28 |
| 2,361,298 A | * | 10/1944 | Laddon | B64C 1/14 114/201 R |
| 2,395,310 A | * | 2/1946 | Hart | F41A 23/20 359/857 |
| 2,405,670 A | * | 8/1946 | Price | B64D 13/04 165/235 |
| 2,434,752 A | * | 1/1948 | Waller | F41H 7/03 241/121 |

(Continued)

FOREIGN PATENT DOCUMENTS

| | | |
|---|---|---|
| EP | 2 145 786 A1 | 1/2010 |
| FR | 3 014 372 A1 | 6/2015 |

OTHER PUBLICATIONS

Dec. 14, 2016 Search Report and Written Opinion issued in French Patent Application No. FR1600471.

*Primary Examiner* — Steven B McAllister
*Assistant Examiner* — Samantha A Miller
(74) *Attorney, Agent, or Firm* — Oliff PLC

(57) ABSTRACT

A device for distribution of conditioning air for vehicle turret comprises at least one air duct sheath, the sheath comprising a chute adapted to be made integral with the vehicle and a shutter adapted to be made integral with the turret. The sheath is the form of an arch of circle coaxial with the rotation axis of turret. The device comprises at least one duct in the form of an arch of circle having the same average radius as that of the sheath and able to slide with respect to the sheath between a closed position in which the duct connects one end of the sheath to another end of said sheath, or to another sheath, for continuity of airflow between the sheaths, and an open position in which the duct is slid within the sheath so as to leave a passage transverse to the sheath along a circular sector.

11 Claims, 9 Drawing Sheets

(56) References Cited

U.S. PATENT DOCUMENTS

| | | | | |
|---|---|---|---|---|
| 2,463,487 A | * | 3/1949 | Macey | B64D 13/02 454/73 |
| 2,466,779 A | * | 4/1949 | Pevney | B64D 13/02 137/601.01 |
| 2017/0028809 A1 | * | 2/2017 | Duinat | B60H 1/00028 |

* cited by examiner

AIR DISTRIBUTION DEVICE FOR TURRET

The technical field of the invention is the technical field of the devices for the distribution of conditioning air for military vehicles comprising a turret.

In order to air-condition the turret of a tank, an aeraulic rotating joint is known from the patent application FR3014372, which describes an aeraulic rotating joint providing an optimum ventilation distribution for all the angular positions of the turret with respect to the body and in particular if the turret does a series of rotations on itself.

To this end, the turret has a pair of coaxial circular sheaths, one being intended to transport cool air and the other being intended to discharge hot air, or vice versa, according to the desired temperature conditions in the turret. The sheaths are generally arranged at the vicinity of the junction plane between the turret and the vehicle body and at the vicinity of the turret ring. The presence of the sheaths in this area of the vehicle as well as their volume obstruct the passage of an operator from the chassis towards the turret or for the maintenance operations. Generally speaking, the sheaths can obstruct the accessibility in their vicinity.

The invention suggests to solve this problem of accessibility and passage by providing means for temporarily breaking the continuity of the sheaths so as to provide a passage therebetween.

Thus, an object of the invention is a device for the distribution of conditioning air for a vehicle turret rotatably mounted with respect to a vehicle body, the device comprising at least one air duct sheath, the sheath comprising a chute adapted to be made integral with the vehicle and a shutter adapted to be made integral with the turret, the sheath comprising at least one first and one second airflow ports, the device being characterized in that the sheath is in the form of an arch of circle coaxial with the rotation axis of the turret, and in that the device comprises at least one duct in the form of an arch of circle having the same average radius as that of the sheath and able to slide with respect to the sheath between a closed position in which the duct connects one end of the sheath to another end of said sheath, or to another sheath, for a continuity of airflow between the sheaths, and an open position in which the duct is slid within the sheath so as to leave a passage transverse to the sheath along a circular sector.

Advantageously, the duct has a bottom comprising an annular sector opening, the annular sector being coaxial with the sheath, the bottom being covered by a cover, the bottom and the cover being able to rotate with respect to each other around the rotation axis of the turret.

Advantageously, the matching of profiles of the inner section of the sheath with the profile of the outer section of the duct ensures a guidance in rotation of the duct with respect to the sheath.

Advantageously, the bottom of the duct comprises means for blocking in position which cooperate with a part of the chute.

Advantageously, the duct has means for blocking in position the cover, the means for blocking in position the cover cooperating with a part of the shutter.

Advantageously, the device comprises two sheaths and two ducts which, in the closed position, join each of the ends of the sheaths and which clear two passages transverse to the sheaths in the open position.

The invention will become more apparent upon reading the following description made in reference to the appended drawings in which.

Figure 1:
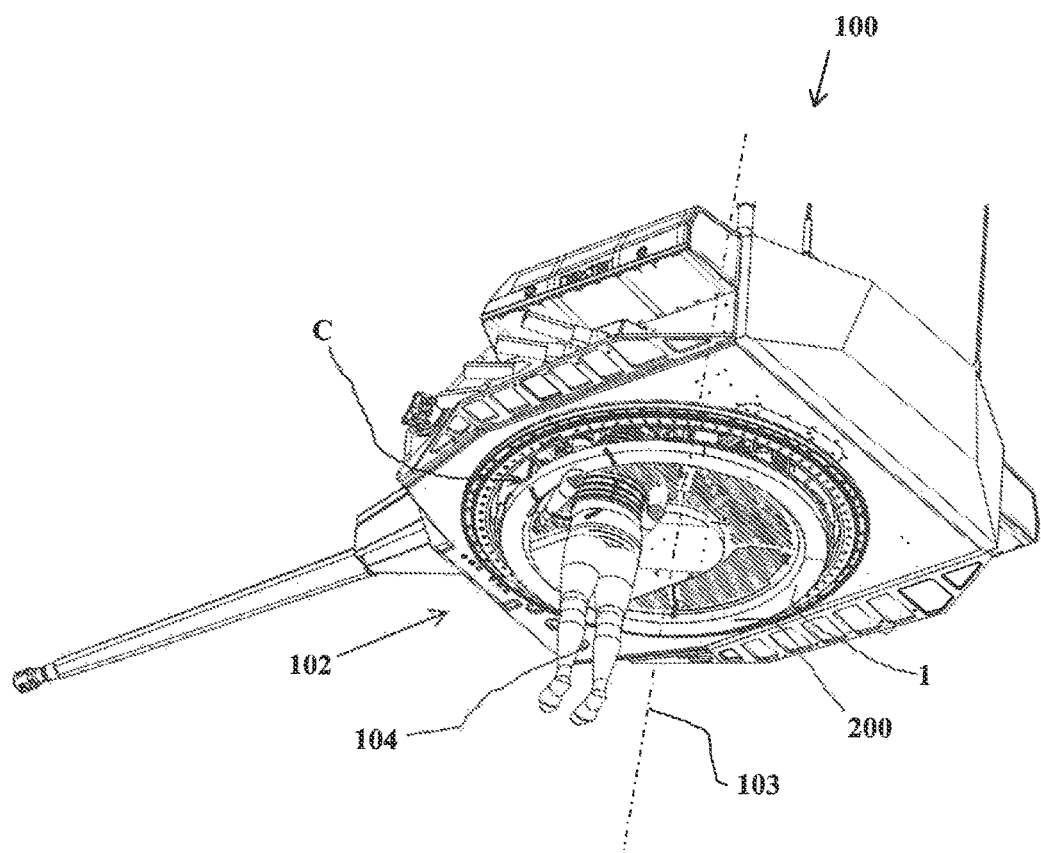
FIG. 1 shows a low angle three-quarter partial view of the lower part of a turret comprising a device according to the invention interfering with an operator.

According to FIG. 1, a turret 100 of a military vehicle comprises a circular opening 102 in its lower part and which is centered on a vertical pivot axis 103 of the turret 100 with respect to a vehicle body (vehicle and vehicle body not shown).

This opening 102 is intended, among other things, for the passage of an operator 104 between the vehicle body and the turret 100 for maintenance operations.

The vehicle is equipped with a device for the distribution of conditioning air 1 such as described in patent FR3014372. This device 1 is coaxial with the opening 102 and comprises at least one circular aeraulic sheath 200 allowing to transport cool air from the body towards the turret 100. In FIG. 1 is represented a encircled area C which allows to locate and highlight an interference between the air distribution device 1 and the operator 104.

Figure 2:
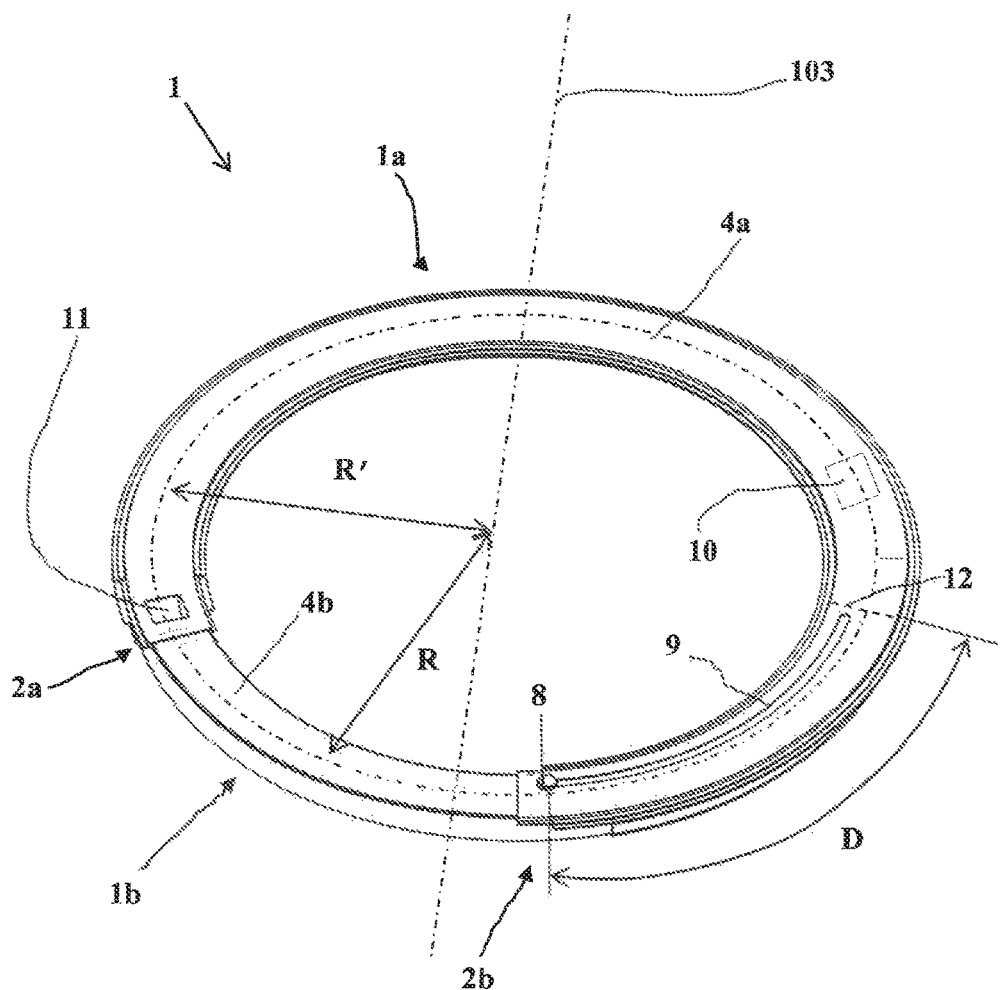
FIG. 2 shows a top three-quarter view of a device according to the invention in the closed position.
Figure 3:
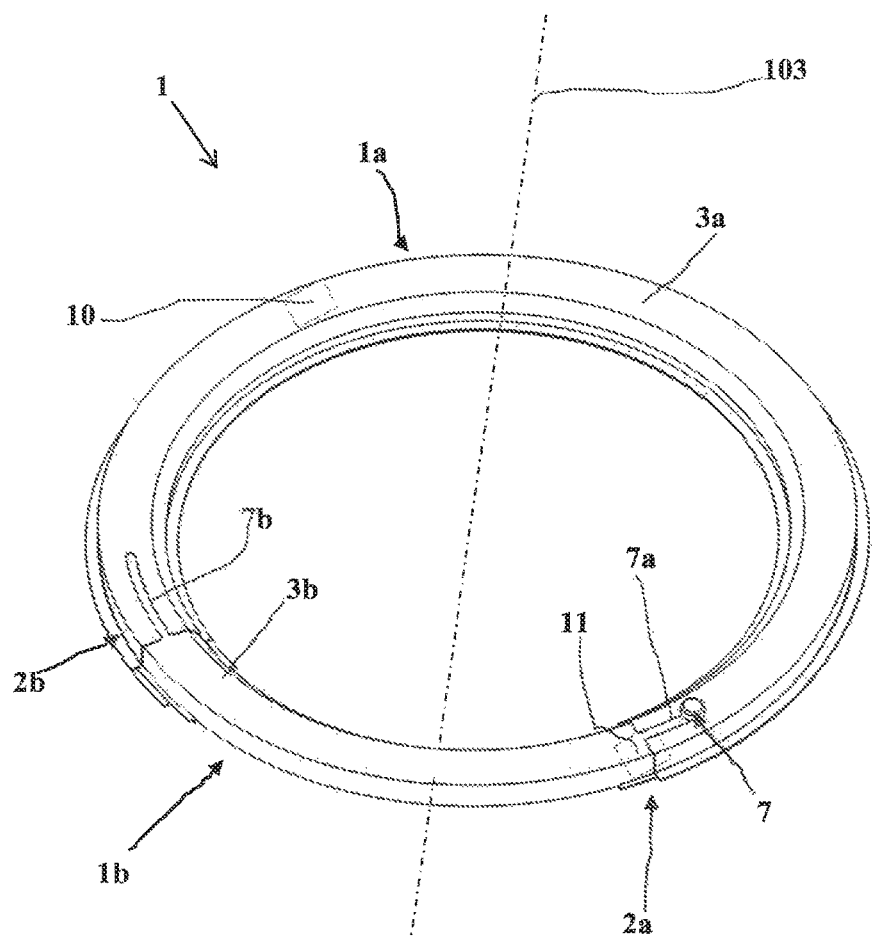
FIG. 3 shows a bottom three-quarter view of a device according to the invention in the closed position.

According to FIGS. 2 and 3, a device 1 according to the invention comprises a sheath 1a in the form of an arch of circle centered on the pivot axis 103 of the turret. This sheath 1a has a first airflow port 10 and a second airflow port 11 respectively intended to allow the cool air to enter from the chassis and to transport this cool air into the turret.

Contrary to the sheath 200 of the state of the art, this sheath 1a is not closed on itself but has an interruption of its continuity, thereby creating two ends 2a and 2b to the sheath 1a.

Figure 4:
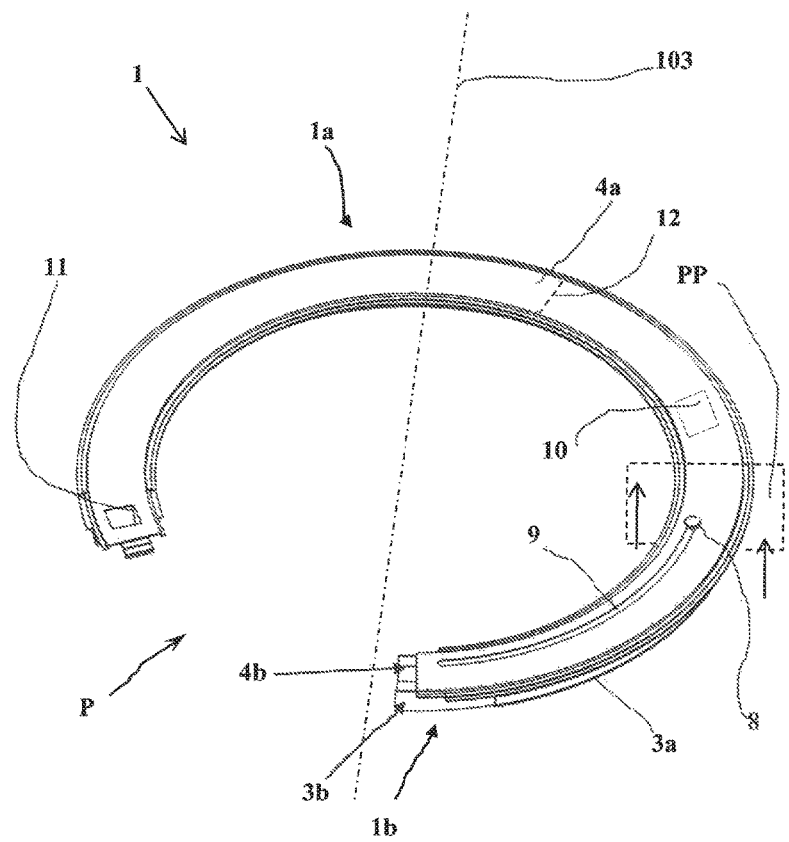
FIG. 4 shows a top three-quarter view of a device according to the invention in the open position.
Figure 5:
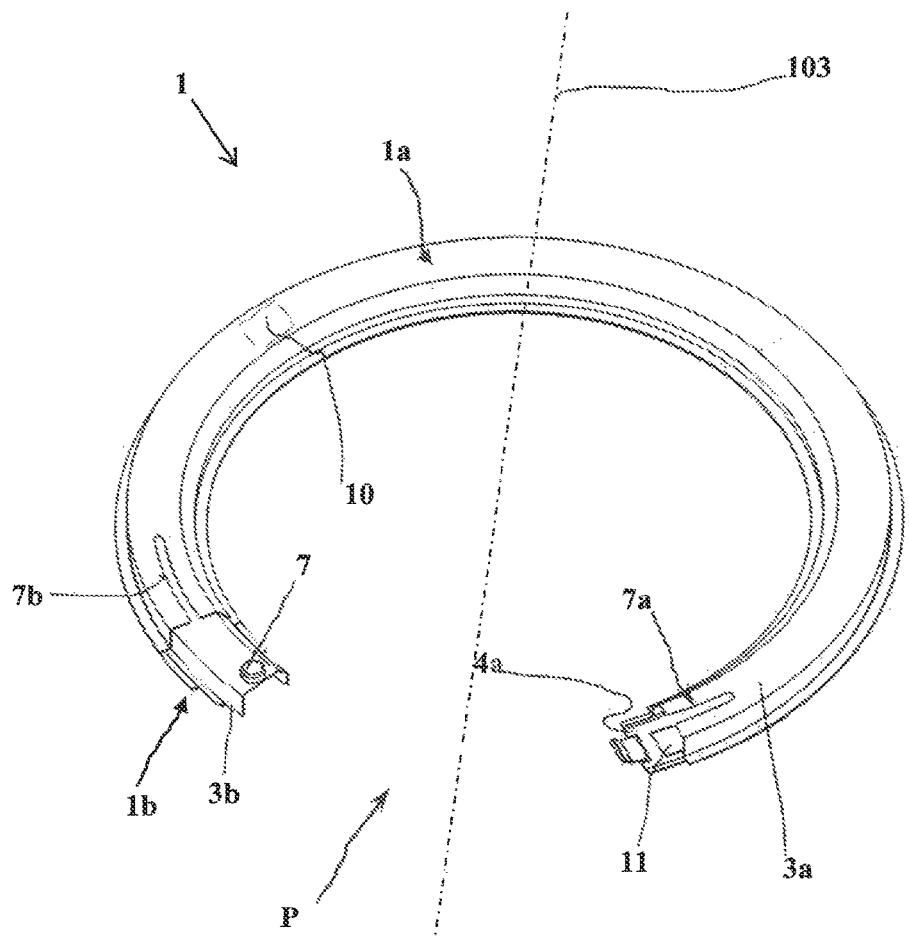
FIG. 5 shows a bottom three-quarter view of a device according to the invention in the open position.

The device 1 can adopt a so-called closed position illustrated in FIGS. 2 and 3 and a so-called open position illustrated in FIGS. 4 and 5. In the closed position, a duct 1b in the form of an arch of circle complementary to that of the sheath 1a connects each end 2a and 2b of the sheath 1a, thereby ensuring a continuity of the airflow between the sheath 1a and the duct 1b and thus within the device 1.

Figure 6:
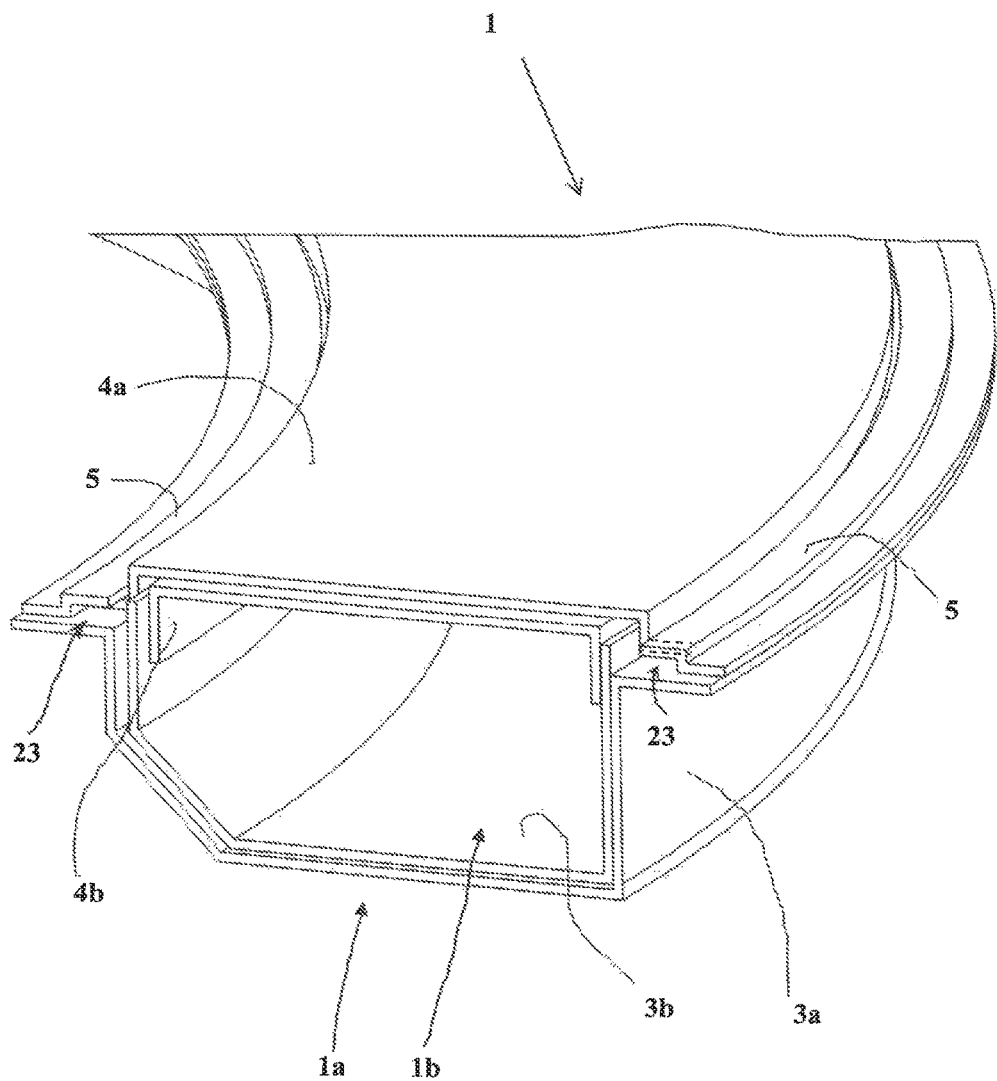
FIG. 6 shows a cross-sectional detailed partial view according to the plane P-P of FIG. 4 of a device according to the invention.

As can be seen in FIGS. 4, 5 and 6, the duct 1b is able to telescopically slide within the sheath 1a to provide an open position to the aeraulic sheath 1 according to the invention. To this end, the arch of circle of the duct 1b has the same average radius R as that R' of the sheath 1a (radii shown in FIG. 2), thus the duct 1b can integrally slide towards one of the ends 2a or 2b of the sheath 1a up to disappearing entirely into the sheath 1a. "Average radius" means the radius of the circle arranged at equal distance from the side walls of the sheath or of the duct.

Figure 7:
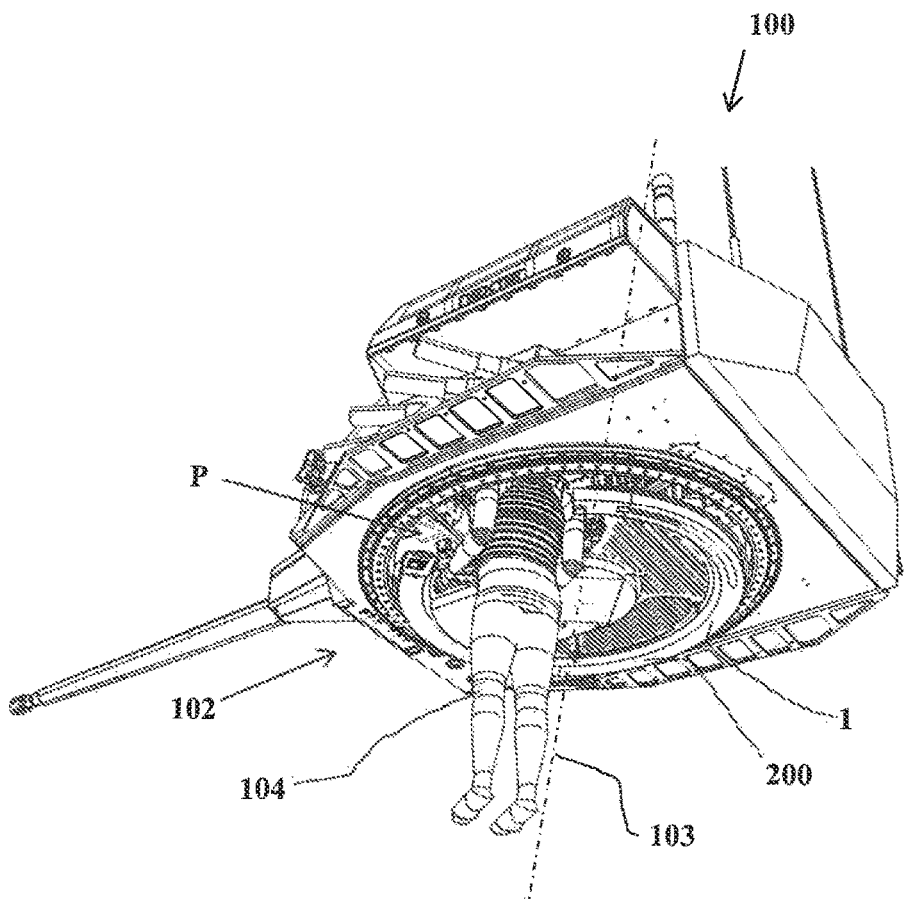
FIG. 7 shows a low angle three-quarter partial view of the lower part of a turret comprising a device according to the invention without any interference with an operator.

A passage P can thus be provided transversally to the device 1, which allows an operator 104 according to FIG. 7 to be able to move at the vicinity of the sheath 1a without interfering with the device 1.

As can be seen in FIGS. 2-6, the sheath 1a comprises a chute 3a which has an opening having the form of an annular sector centered on the rotation axis 103, the opening being covered by a shutter 4a. Similarly, the duct 1b has a bottom 3b which has an opening having the form of an annular sector centered on the rotation axis 103 and which is covered by a cover 4b.

Figure 8:
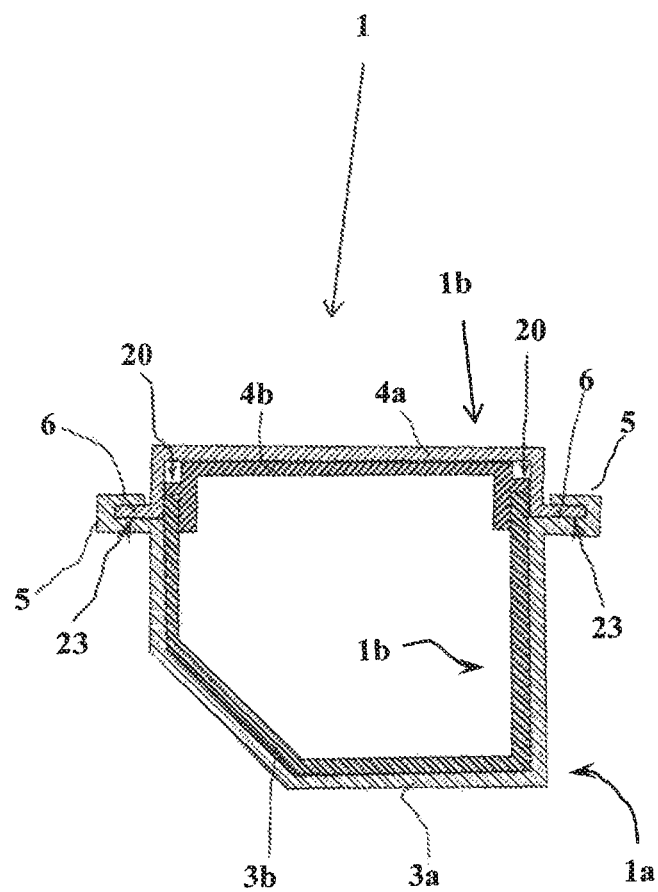
FIG. 8 shows a cross-sectional schematic view along the plane P-P of FIG. 4.

It can be noted that, in FIG. 4 and FIGS. 6 and 8, the chute 3a has two rims 5 which each delimit a circular slot 23. The sheath 1a thus comprises such a slot 23 on its side intended to be oriented towards the pivot axis of the turret, as well as on the opposite side intended to be oriented to the outside of the turret.

Each slot 23 is intended to receive a fin 6 arranged on either side of the shutter 4a.

In this manner, the shutter 4a is rotatably guided around the turret axis 103 and can rotate with respect to the chute 3a.

The duct 1b is conformed with a profile of its outer section in correspondence with the inner profile of the section of the sheath 1a. In this way, it is easy to have the duct 1b slide into the sheath 1a. In addition, this shape matching limits the air leaks at the joints of the sheaths 1a and 1b.

Visible in FIG. 8, like the shutter 4a, the cover 4b is rotatably movable with respect to the bottom 3b but also with respect to the chute 3a. A rim 20 on each side of the cover 4b allows the cover 4b to be supported on the sides of the bottom 3b.

In the closed position, it is necessary for the chute 3a to be integral with the bottom 3b such that the different frictions to which are subjected the chute 3a and the bottom 3b do not cause the opening of the device 1. The same applies for the shutter 4a which must be integral with the cover 4b in the closed position. To this end, the device 1 comprises first uniting means 7 and second uniting means 8 intended respectively, for one of the them, to make the chute 3a integral with the bottom 3b and, for the other, to make the shutter 4a integral with the cover 4b.

Thus, when the device is in its closed position, namely when the duct 1b joins both ends of the sheath 1a, the bottom 3b of the duct 1b is integral with the chute 3a of the sheath 1a and the cover 4b of the duct 1b is integral with the shutter 4a of the sheath.

When rotating the turret, the cover 4b and the shutter 4a, which are integral with the turret, will pivot together with respect to the bottom 3b and to the chute 3a which are integral with the vehicle.

The turret will be stopped in a position allowing to position the cover 4b directly above the bottom 3b. It is then possible to separate these two elements, by unscrewing the first uniting means 7 and second uniting means 8, to be able to slide the two parts of the duct 1b into the sheath 1a and clear the passage P.

The first uniting means 7 visible in FIG. 3 will have, for example, a knurled screw 7 conventionally known by the one skilled in the art, integral with the bottom 3b and able to circulate into an oblong hole 7a in the form of an arch of circle of the chute 3a, and one end of which leads to the first end 2a of the chute 3a. The uniting means 7 (knurled screw) presses the chute 3a against the bottom 3b thus blocking the bottom 3b in the closed position with respect to the chute 3a.

It can be noted that the second end 2b of the chute 3a also comprises an oblong hole 7b which allows to block the bottom 3b in the open position.

In the same way, the second uniting means 8 also comprises, for example, a knurled screw 8 intended to press a face of the shutter 4a on a corresponding face of the cover 4b so as to immobilize them with respect to each other. This second uniting means 8 allows to block the cover 4b in the open position or closed position with respect to the shutter 4a, but it also allows intermediary opening settings thanks to an oblong hole 9 arranged on the shutter 4a, the oblong hole 9 extending on an angular sector having a length at least equivalent to the length of the opening between the ends 2a and 2b of the sheath 1a. To avoid any leak by the oblong hole, the one skilled in the art will make sure to position the second knurled screw 8 at a distance D from the first end 12 of the cover 4b at least equal to once the length of the oblong hole 9 as shown in FIG. 2.

Thus, when the air distribution device 1 is in the closed position, the airflow can circulate without any discontinuity within the entire sheath 1 and for all bearing alignments of the turret.

As in FIG. 7, when the accessibility to the turret is desired, the turret is placed in a predetermined bearing position which makes the shutter 4a above the chute 3a correspond to the cover 4b above the bottom 3b. The bottom 3b and the cover 4b forming the duct 1b can thus be made to slide within the sheath 1a to provide an open position of the device 1 and thus leave a cleared access towards the turret for an operator.

The device according to the invention can have a plurality of sheaths 1a and a plurality of ducts 1b. In this case, the device 1 shown in FIG. 9 has two sheaths 1a connected to each other by two ducts 1b which can slide within the sheaths 1a so as to clear two areas of passage P.

Figure 9:
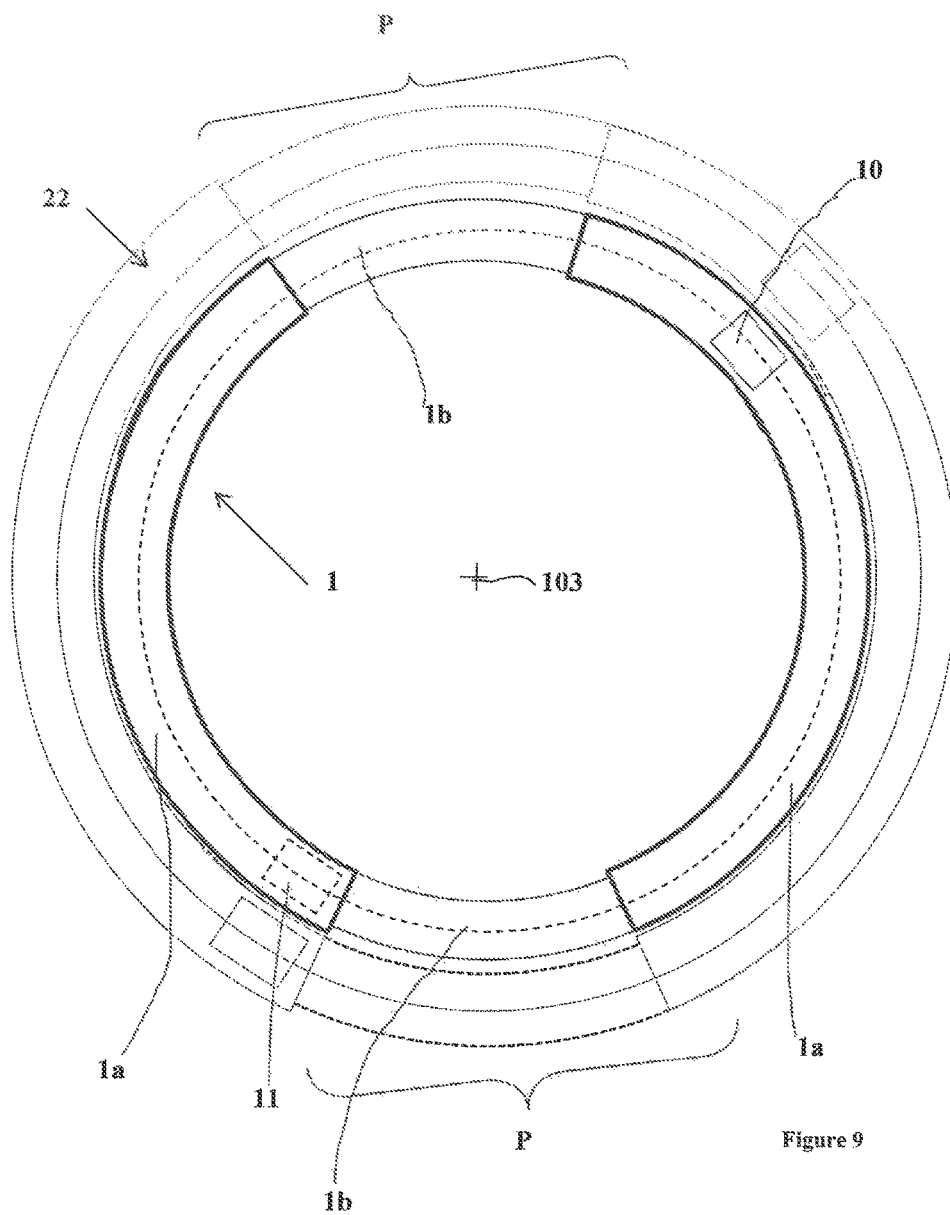
FIG. 9 shows a top schematic view of another embodiment of the invention.

As taught in patent FR3014372, it is possible to associate several air distribution devices so as to make cool air circulate within a first device and hot air within a second device. Thus, it can be noted that the devices could be concentrically arranged above each other or around each other. Obviously, the opening areas of the sheaths should correspond. As an example, FIG. 9 shows in dotted lines a second device 22 surrounding the first device 1 and the areas of passage P of which correspond.

The invention claimed is:

1. A device for distribution of conditioning air for a vehicle turret rotatably mounted with respect to a vehicle body, the device comprising:
   a sheath comprising a chute adapted to be made integral with the vehicle and a shutter adapted to be made integral with the turret, the sheath comprising at least one first airflow port and one second airflow port,
   wherein the sheath is in the shape of an arc of a circle that is coaxial with a rotation axis of the turret and has two ends, and
   wherein the device comprises a duct in the shape of an arc of a circle having a same average radius as that of the sheath, the duct being slidable with respect to the sheath between a closed position, in which the duct connects one end of the two ends of the sheath to another end of the two ends of the sheath for a continuity of airflow between the two ends of the sheath, and an open position, in which the duct is slid within the sheath so as to leave a passage between the two ends transverse to the sheath along a circular sector.

2. The air distribution device according to claim 1, wherein the duct has a bottom comprising an annular sector opening, the annular sector opening being coaxial with the sheath, the bottom being covered by a cover, the bottom and the cover being able to rotate with respect to each other around the rotation axis of the turret.

3. The air distribution device according to claim 2, wherein a profile of an inner section of the sheath matches a profile of an outer section of the duct to ensure guidance in rotation of the duct relative to the sheath.

4. The air distribution device according to claim 3, wherein the bottom of the duct comprises means for blocking in position, which cooperate with a part of the chute.

5. The air distribution device according to claim 1, wherein the duct has means for blocking in position the cover, the means for blocking in position the cover cooperating with a part of the shutter.

6. The air distribution device according to claim 1, wherein the device comprises a second sheath and a second duct that surround the sheath and the duct, the second sheath being in the shape of an arc of a circle that is coaxial with the rotation axis of the turret and has two ends, the second duct being in the shape of an arc of a circle having a same average radius as that of the second sheath, wherein, in a closed position, the second duct joins the two ends of the second sheath, and, in an open position, the second duct is slid within the second sheath to clear the passage transverse to the sheath and the second sheath.

7. A device for distribution of conditioning air for a vehicle turret rotatably mounted with respect to a vehicle body, the device comprising:

a first sheath and a second sheath, each of the first sheath and the second sheath including a chute adapted to be made integral with the vehicle and a shutter adapted to be made integral with the turret, the first sheath and the second sheath each including an airflow port, the first sheath and the second sheath each being in the shape of an arc of a circle that is coaxial with a rotation axis of the turret and has two ends, and a first duct and a second duct, each of the first duct and the second duct being in the shape of an arc of a circle having a same average radius as that of the first sheath and the second sheath, the first duct and the second duct being configured to slide relative to the first sheath and the second sheath, respectively, between a closed position, in which the first duct connects a first end of the first sheath to a second end of the second sheath and a second end of the first sheath to a first end of the second sheath for a continuity of airflow between the first sheath and the second sheath, and an open position, in which the first duct and the second duct are slid within the first sheath and the second sheath, respectively, so as to clear a first passage between the first end of the first sheath and the second end of the second sheath and a second passage between the second end of the first sheath to the first end of the second sheath transverse to the first sheath and the second sheath along a circular sector.

8. The air distribution device according to claim 7, wherein each of the first duct and the second duct has a bottom comprising an annular sector opening, the annular sector opening being coaxial with the first sheath and the second sheath, the bottom being covered by a cover, the bottom and the cover being able to rotate with respect to each other around the rotation axis of the turret.

9. The air distribution device according to claim 8, wherein a profile of an inner section of the first sheath matches a profile of an outer section of the first duct, and a profile of an inner section of the second sheath matches a profile of an outer section of the second duct to ensure guidance in rotation of the first duct and the second duct relative to the first sheath and the second sheath.

10. The air distribution device according to claim 9, wherein the bottom of the duct comprises means for blocking in position, which cooperate with a part of the chute.

11. The air distribution device according to claim 7, wherein the duct has means for blocking in position the cover, the means for blocking in position the cover cooperating with a part of the shutter.

\* \* \* \* \*